United States Patent
Xiao

(10) Patent No.: US 11,320,581 B2
(45) Date of Patent: May 3, 2022

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventor: Shiyuan Xiao, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 470 days.

(21) Appl. No.: 16/472,982

(22) PCT Filed: Mar. 28, 2019

(86) PCT No.: PCT/CN2019/080052
§ 371 (c)(1),
(2) Date: Jun. 24, 2019

(87) PCT Pub. No.: WO2020/133770
PCT Pub. Date: Jul. 2, 2020

(65) Prior Publication Data
US 2021/0356650 A1    Nov. 18, 2021

(30) Foreign Application Priority Data
Dec. 28, 2018    (CN) .......................... 201811617722.6

(51) Int. Cl.
*F21V 8/00* (2006.01)

(52) U.S. Cl.
CPC ......... *G02B 6/0073* (2013.01); *G02B 6/0051* (2013.01); *G02B 6/0068* (2013.01)

(58) Field of Classification Search
CPC ... G02B 6/0073; G02B 6/0051; G02B 6/0068
See application file for complete search history.

(56) References Cited

U.S. PATENT DOCUMENTS

| | | |
|---|---|---|
| 2011/0286202 A1 | 11/2011 | Kim et al. |
| 2012/0281155 A1 | 11/2012 | Takano et al. |
| 2012/0307163 A1* | 12/2012 | Fujine ................ G02F 1/13439 348/791 |
| 2013/0083271 A1 | 4/2013 | Tsai et al. |
| 2016/0380170 A1 | 12/2016 | He |

(Continued)

FOREIGN PATENT DOCUMENTS

| | | |
|---|---|---|
| CN | 102374455 A | 3/2012 |
| CN | 102393580 A | 3/2012 |

(Continued)

*Primary Examiner* — Mary Ellen Bowman

(57) ABSTRACT

The present application provides a backlight module and a display device, wherein mini light-emitting diode (mini-LED) chips disposed on a substrate for light emission, the mini-LED chips being spaced apart from each other and comprising a first LED chip for emitting red light, a second LED chip for emitting green light, a third LED chip for emitting blue light, and a fourth LED chip for emitting yellow light; and wherein a sealant is transparent and disposed on the substrate and covering the mini-LED chips for package; and an optical film structure disposed on the sealant.

16 Claims, 2 Drawing Sheets

(56) References Cited

U.S. PATENT DOCUMENTS

| | | | | |
|---|---|---|---|---|
| 2018/0120639 A1* | 5/2018 | Shih | ................... | G02F 1/133504 |
| 2018/0284338 A1* | 10/2018 | Wang | ................... | G02B 6/0043 |
| 2019/0107755 A1* | 4/2019 | Chen | ................... | G02B 6/0026 |
| 2019/0302529 A1* | 10/2019 | Zha | ................... | G02F 1/133305 |
| 2019/0331964 A1 | 10/2019 | Xiao | | |

FOREIGN PATENT DOCUMENTS

| | | | | |
|---|---|---|---|---|
| CN | 102478187 | A | | 5/2012 |
| CN | 102751275 | A | | 10/2012 |
| CN | 102804243 | A | | 11/2012 |
| CN | 104633551 | A | | 5/2015 |
| CN | 107219679 | A | | 9/2017 |
| CN | 108181763 | A | | 6/2018 |
| CN | 108445675 | A | | 8/2018 |
| CN | 108563069 | A | | 9/2018 |
| CN | 207883228 | U | * | 9/2018 |
| CN | 207883228 | U | | 9/2018 |
| WO | 2011102185 | A1 | | 8/2011 |

* cited by examiner

BACKLIGHT MODULE AND DISPLAY DEVICE

BACKGROUND OF INVENTION

Field of Invention

The present invention relates to a display technology, and in particular, to a backlight module and a display device.

Description of Prior Art

With development of mini-light emitting diode (mini-LED) technology, application fields of a mini-LED surface light source have been broadened, and more and more applications have been proposed.

At present, a basic structure of a display device having the mini-LED surface light source (as shown in FIG. 1) includes a display panel, an optical structure layer, and a mini-LED surface light source, wherein the mini-LED surface light source includes a sealant (containing a yellow phosphor), a mini-LED blue chip, and a surface light source substrate.

However, the single color light emitted by the mini-LED surface light source needs to pass through the yellow phosphor, which forms stray light, resulting in low color saturation.

SUMMARY OF INVENTION

An embodiment of the present invention provides a backlight module and a display device, which can solve the technical problem that the existing mini-LED surface light source easily forms stray light when emitting a single color light, thereby reducing the color saturation.

An embodiment of the present invention provides a backlight module, including: a substrate; a plurality of mini-light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light; a sealant, being transparent, disposed on the substrate and covering the mini-LED chips for package; and an optical film structure disposed on the sealant to diffuse and brighten light emitted by the mini-LED chips; wherein the first LED chip, the second LED chip, the third LED chip, and the fourth LED chip are arranged side-by-side in a horizontal or vertical direction to form a repeating unit; and the optical film structure comprises a first optical film layer, a second optical film layer and a third optical film layer disposed sequentially on the sealant; and wherein the first optical film layer is a light diffusing layer, the second optical film layer is a light brightening layer, and the third optical film layer is a light diffusing layer or a composite layer of a light diffusing layer and a light brightening layer.

In the backlight module of the present invention, a plurality of the repeating units are arranged in an array, and the third LED chip is adjacent to a side of the fourth LED chip.

In the backlight module of the present invention, a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

Another embodiment of the present invention further provides a backlight module, including: a substrate a plurality of mini-light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light, and a sealant, being transparent, disposed on the substrate and covering the mini-LED chips for package; and an optical film structure disposed on the sealant to diffuse and brighten light emitted by the mini-LED chips.

In the backlight module of the present invention, the first LED chip, the second LED chip, the third LED chip, and the fourth LED chip are arranged side by side in a horizontal or vertical direction to form a repeating unit.

In the backlight module of the present invention, the first LED chip, the second LED chip, the third LED chip, and the fourth LED chip are arranged two-by-two and side-by-side to form a repeating unit.

In the backlight module of the present invention, the repeating unit has a square shape.

In the backlight module of the present invention, the plurality of repeating units are arranged in an array, and the third LED chip is adjacent to a side of the fourth LED chip.

In the backlight module of the present invention, a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

In the backlight module of the present invention, the optical film structure comprises a first optical film layer, a second optical film layer, and a third optical film layer, disposed sequentially on the sealant; wherein the first optical film layer is a light diffusing layer, the second optical film layer is a light brightening layer, and the third optical film layer is a light diffusing layer or a composite layer of a light diffusing layer and a light brightening layer.

The application also relates to a display device, including a backlight module and a display panel disposed on the backlight module, the backlight module comprising: a substrate a plurality of mini-light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light; a sealant, being transparent, disposed on the substrate and covering the mini-LED chips for package; and the optical film structure disposed on the sealant to diffuse and brighten light emitted by the mini-LED chips.

In the display device of the present invention, the first LED chip, the second LED chip, the third LED chip, and the fourth LED chip are arranged two-by-two and side-by-side to form a repeating unit, a plurality of repeating units are arranged in an array, and the third LED chip is adjacent to a side of the fourth LED chip.

In the display device of the present invention, the repeating unit has a square shape.

In the display device of the present invention, the first LED chip, the second LED chip, the third LED chip, and the fourth LED chip are arranged side by side in a horizontal or vertical direction to form a repeating unit, the plurality of repeating units are arranged in an array, and the third LED chip is adjacent to a side of the fourth LED chip.

In the display device of the present invention, a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

In the display device of the present invention, the optical film structure comprises a first optical film layer, a second optical film layer and a third optical film layer disposed sequentially on the sealant; and wherein the first optical film layer is a light diffusing layer, the second optical film layer is a light brightening layer, and the third optical film layer is a light diffusing layer or a composite layer of a light diffusing layer and a light brightening layer.

Compared with the backlight module and the display device of the prior art, the backlight module and the display device of the present invention omit the step of doping the yellow phosphor into the sealant by disposing the first, second, third, and fourth LED chips. The transparent sealant of the present invention reduces the possibility of stray light generation, improves a saturation of color, and has a function of switching color saturation. The present invention solves the technical problem that the existing mini-LED surface light source easily forms stray light when emitting a single color light, thereby reducing the color saturation.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
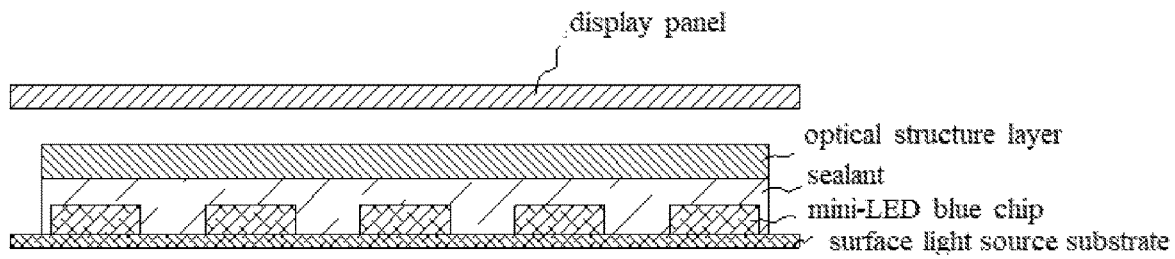
FIG. 1 is a schematic structural view of a display device of a mini-LED surface light source of prior art.

Please refer to the figures in the drawings, in which the same reference numerals represent the same components. The following description is based on the specific embodiments of the present invention as illustrated, and should not be construed as limiting the specific embodiments that are not described herein.

Figure 2:
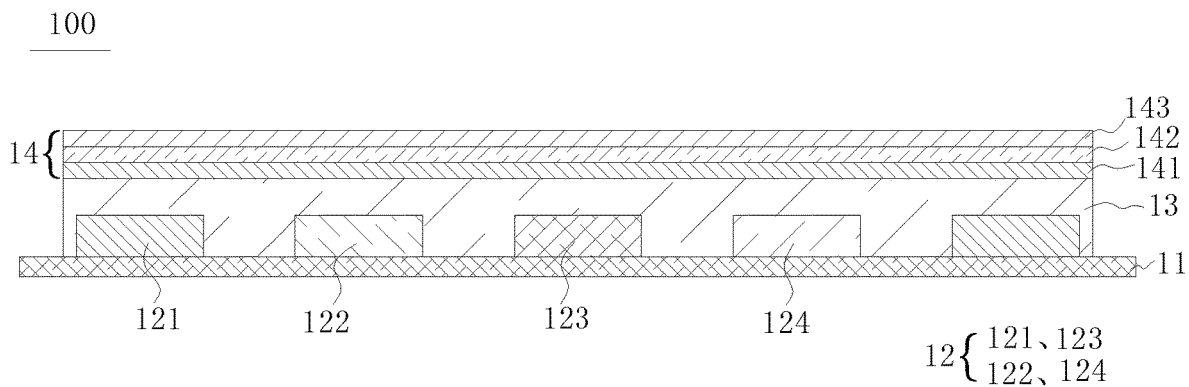
FIG. 2 is a schematic structural diagram of a backlight module according to a first embodiment of the present invention.
Figure 3:
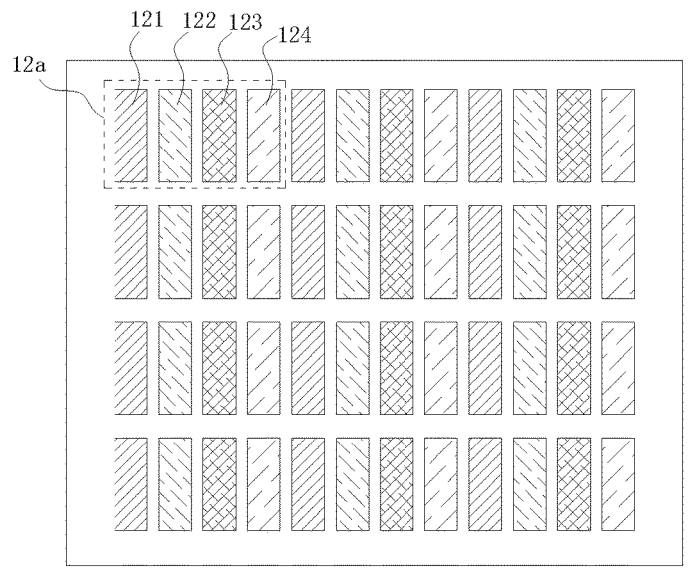
FIG. 3 is a schematic diagram showing an arrangement structure of mini-light-emitting diode (mini-LED) chips of a backlight module according to a first embodiment of the present invention.

Referring to FIG. 2 and FIG. 3, FIG. 2 is a schematic structural diagram of a backlight module according to a first embodiment of the present invention, and FIG. 3 is a schematic diagram showing an arrangement structure of mini-light-emitting diode (mini-LED) chips of a backlight module according to a first embodiment of the present invention. The backlight module 100 of the first embodiment includes a substrate 11, mini-light-emitting diode (mini-LED) chips 12, a sealant 13, and an optical module structure 14.

The mini-LED chip 12 is used for light emission and is disposed on the substrate 11. The mini-LED chips 12 are spaced apart from each other. The mini-LED chip 12 includes a first LED chip 121, a second LED chip 122, a third LED chip 123, and a fourth LED chip 124. The first LED chip 121 emits red light. The second LED chip 122 emits green light. The third LED chip 123 emits blue light. The fourth LED chip 124 emits yellow light.

The sealant 13 is transparent and is disposed on the substrate 11 and covers the mini-LED chip 12 for packaging.

The optical film structure 14 is configured to diffuse and brighten the light emitted by the mini-LED chip 12. The optical film structure 14 is disposed on the sealant 13.

The backlight module 100 of the present invention omits the step of doping the yellow phosphor into the sealant 13 by providing the first, second, third, and fourth LED chips (121, 122, 123, and 124). The transparent sealant 13 can prevent the generation of stray light.

Because in the prior art, blue light emitted by the blue light emitting chip is mixed with yellow light emitted from the yellow phosphor in the sealant, white light is thus produced. However, due to uneven distribution of the yellow phosphor in the sealant and due to the nature of the material, the yellow phosphor also emits stray light of other colors. In addition, an amount of yellow light emitted by the yellow phosphor is less than that of blue light, causing the light emitted, after light-mixing, to be not pure white. Therefore, when the backlight module is used in a display device, the color saturation displayed by the display device is low.

In the first embodiment, the sealant 13 is transparent, thereby reducing the possibility of stray light generation. When the display device needs to display a single color, such as red, green, blue, and yellow, the backlight module 100 can directly excite one of the four types of chips, and directly emit light by using a single type of a chip, to provide a light source for the display device, improving the saturation of single color.

When the display device needs to display a plurality of colors, the four chips in the backlight module 100 can be excited in various combinations thereof and emit white light in the mixed light. For example, the third LED chip 123 and the fourth LED chip 124 can be excited to mix blue light and yellow light to form white light, or the first LED chip 121, the second LED chip 122, and the third LED chip 123 can also be excited to mix red light, green light and blue light to form white light.

In addition, it is also possible to control the effect of switching color saturation by controlling the number of illuminations of different mini-LED chips 12.

In the first embodiment of the backlight module 100, a first LED chip 121, a second LED chip 122, a third LED chip 123, and a fourth LED chip 124 are arranged side by side in a horizontal or vertical direction to form a repeating unit 12a.

In the first embodiment, the four types of LED chips in the repeating unit 12a are arranged in the horizontal direction in an order of the first LED chip 121, the second LED chip 122, the third LED chip 123, and the fourth LED chip 124, in an order of the second LED chip 122, the first LED chip 121, the third LED chip 123, and the fourth LED chip 124, or in an order of the fourth LED chip 124, the third LED chip 123, the first LED chip 121, and the second LED chip 122, and so on. The first embodiment is described by taking the first arrangement as an example, but is not limited thereto.

In the first embodiment of the backlight module 100, the plurality of repeating units 12a are arranged in an array. The third LED chip 123 is adjacent to a side of the fourth LED chip 124. The array arrangement makes the repeating unit 12a evenly arranged, improving the uniformity of the light output. In addition, the third LED chip 123 is disposed adjacent to the fourth LED chip 124, so that blue light and yellow light can be quickly mixed to improve light emitting efficiency. In this case, the third LED chip 123 and the fourth LED chip 124 are placed close to each other, so that the blue light and the yellow light are sufficiently mixed to form a purer white color, thus improving the color saturation of the display device.

In the first embodiment of the backlight module 100, the light emitting area of the first LED chip 121 is less than the light emitting area of the fourth LED chip 124. The light emitting area of the fourth LED chip 124 is less than the light emitting area of the second LED chip 122. The light emitting area of the second LED chip 122 is less than the light emitting area of the third LED chip 123.

Under the condition of the same area, the luminance of the first LED chip 121 is greater than the luminance of the fourth LED chip 124, the luminance of the fourth LED chip 124 is greater than the luminance of the second LED chip 122, and the luminance of the second LED chip 122 is greater than the luminance of the third LED chip 123. Accordingly, in order to improve uniformity of the luminance of the light in the first embodiment of the backlight module 100, the light emitting area of the first LED chip 121 is set to be less than the light emitting area of the fourth LED chip 124, the light emitting area of the fourth LED chip 124 is set to be less than the light emitting area of the second LED chip 122, and the light emitting area of the second LED chip 122 is set to be less than the light emitting area of the third LED chip 123.

In the first embodiment of the backlight module 100, the optical film structure 14 includes a first optical film layer 141, a second optical film layer 142, and a third optical film layer 143 disposed sequentially. The first optical film layer 141 is disposed on a sealant 13.

The first optical film layer 141 is a light-diffusing layer. The second optical film layer 142 is a light-enhancing layer. The third optical film layer 143 is a light-diffusing layer or a composite layer of a light-diffusing layer and a light-enhancing layer.

The first optical film layer 141 is configured to diffuse the light emitted by the mini-LED chip 12, thereby expanding the light-emitting angle, and therefore when the light is mixed, the light-mixing is more sufficient, thus improving the light-mixing effect.

The second optical film layer 142 is configured to brighten the diffused light to improve the brightness of the backlight module 100.

The third optical film layer 143 is configured to diffuse and/or brighten the brightened light again to further enlarge the light-emitting angle of the light and improve the light-mixing effect, and further improve the brightness of the overall light source.

In some embodiments, the light emitting surfaces of the fourth LED chip 124 and the third LED chip 123 are concave. Such a setting expands the light-emitting angle of the third and fourth LED chips and improves the light-mixing effect. The light exiting surfaces of the first and second LED chips may also be concave surfaces.

Optionally, the concave surface of the mini-LED chip is a concave spherical surface, so that the light-diffusing angle is more balanced.

Optionally, the concave surface of the mini-LED chip is a concave curved surface, so that most of the light emitted by the mini-LED chip is diffused toward the adjacent different LED chips to achieve the purpose of improving the light-mixing effect.

Figure 4:
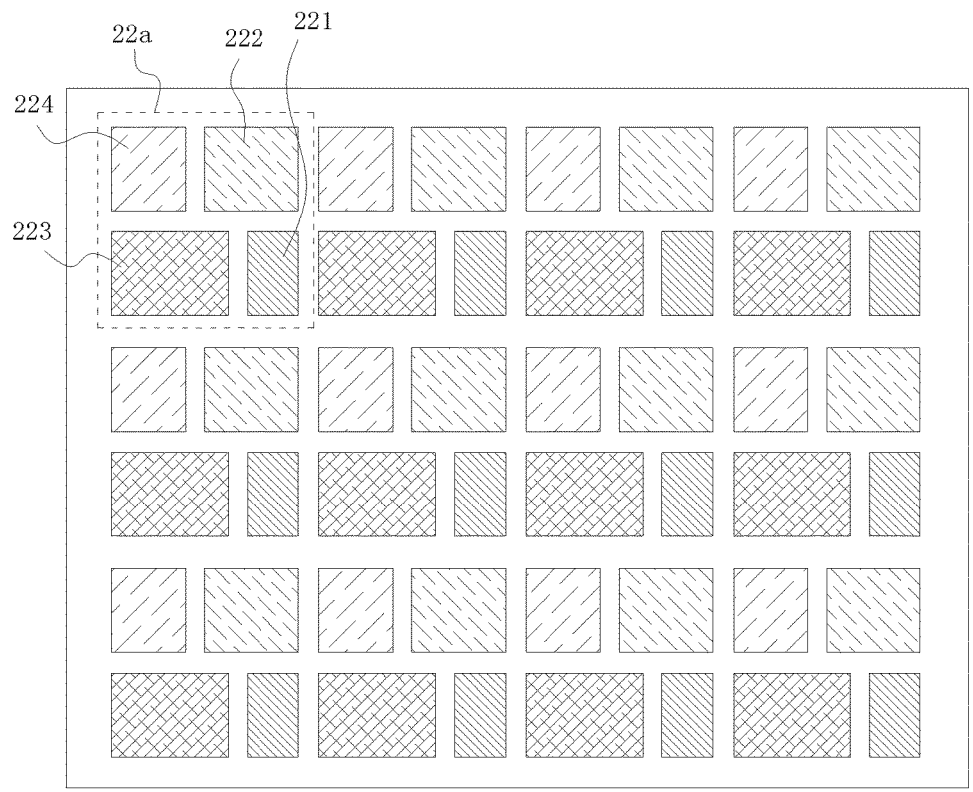
FIG. 4 is a schematic diagram showing an arrangement structure of mini-LED chips of a backlight module according to a second embodiment of the present invention.

Please refer to FIG. 4. FIG. 4 is a schematic diagram showing the arrangement structure of the mini-LED chips of the backlight module according to the second embodiment of the present invention. In the backlight module of the second embodiment, a difference between this embodiment and the first embodiment is that: a first LED chip 221, a second LED chip 222, a third LED chip 223, and a fourth LED are arranged two-by-two and side-by-side to form a repeating unit 22a.

Further, the repeating unit 22a has a square shape.

This setting reduces distances between the mini-LED chips and improves the light-mixing effect.

Figure 5:
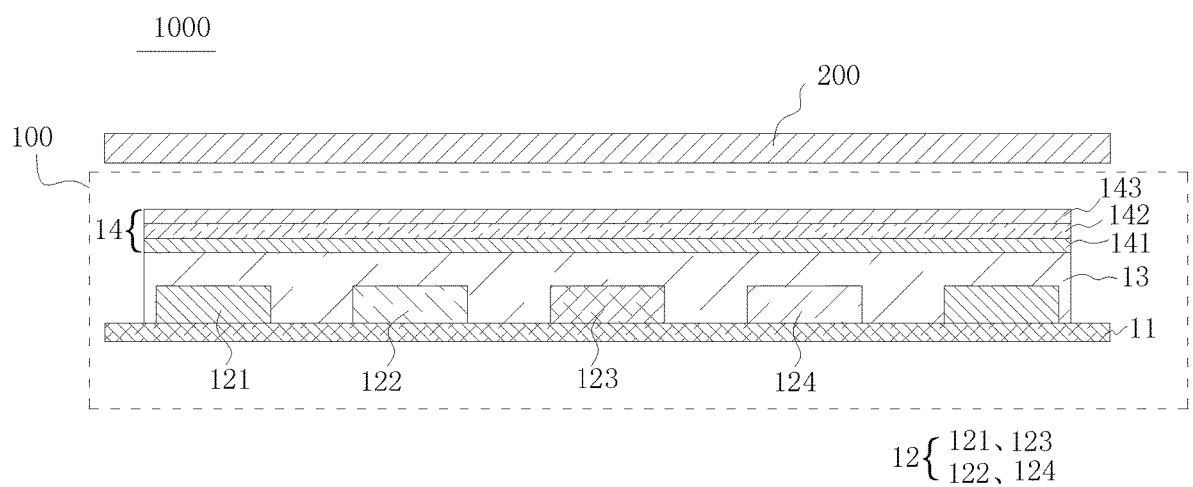
FIG. 5 is a schematic diagram showing an arrangement structure of mini-LED chips of a display device according to an embodiment of the present invention.

Please refer to FIG. 5. FIG. 5 is a schematic diagram showing the arrangement structure of mini-LED chips of a display device according to an embodiment of the present invention. The present invention also relates to a display device 1000 including a backlight module 100 and a display panel 200 disposed on the backlight module 100. The backlight module 100 includes a substrate 11, a mini light-emitting diode (mini LED) chip 12, a sealant 13, and an optical film structure 14.

The mini-LED chip 12 is used for light emission and is disposed on the substrate 11. The mini-LED chips 12 are spaced apart from each other. The mini-LED chip 12 includes a first LED chip 121, a second LED chip 122, a third LED chip 123, and a fourth LED chip 124. The first LED chip 121 emits red light. The second LED chip 122 emits green light. The third LED chip 123 emits blue light. The fourth LED chip 124 emits yellow light.

The sealant 13 is transparent and is disposed on the substrate 11 and covers the mini-LED chips 12 for packaging.

The optical film structure 14 is configured to diffuse and brighten the light emitted by the mini-LED chips 12. The optical film structure 14 is disposed on the sealant 13.

The backlight module 100 of the present invention omits the step of doping the yellow phosphor into the sealant 13 by providing the first, second, third, and fourth LED chips (121, 122, 123, and 124). The transparent sealant 13 can prevent the generation of stray light.

In the first embodiment, the sealant 13 is transparent, thereby reducing the generation of stray light. When the display device needs to display a single color, such as red, green, blue, and yellow, the backlight module 100 can directly excite one of the four types of chips, and directly emit light by using a single type of a chip, to provide a light source for the display device, improving the saturation of single color.

When the display device 1000 needs to display a plurality of colors, the four chips in the backlight module 100 can be excited in various combinations thereof and emit white light in the mixed light. For example, the third LED chip 123 and the fourth LED chip 124 can be excited to mix blue light and yellow light to form white light, or the first LED chip 121, the second LED chip 122, and the third LED chip 123 can also be excited to mix red light, green light and blue light to form white light.

In addition, it is also possible to control the effect of switching color saturation by controlling the number of illuminations of different mini-LED chips 12.

In this embodiment, a first LED chip 121, a second LED chip 122, a third LED chip 123, and a fourth LED chip 124 are arranged side by side in a horizontal or vertical direction to form a repeating unit 12a.

In this embodiment, the four types of LED chips in the repeating unit 12a are arranged in the horizontal direction in an order of the first LED chip 121, the second LED chip 122, the third LED chip 123, and the fourth LED chip 124, in an order of the second LED chip 122, the first LED chip 121, the third LED chip 123, and the fourth LED chip 124, or in an order of the fourth LED chip 124, the third LED chip 123, the first LED chip 121, and the second LED chip 122, and so on. The first embodiment is described by taking the first arrangement as an example, but is not limited thereto.

In the embodiment of the backlight module 1000, the plurality of repeating units 12a are arranged in an array. The third LED chip 123 is adjacent to a side of the fourth LED chip 124. The array arrangement makes the repeating unit 12a evenly arranged, improving the uniformity of the light output. In addition, the third LED chip 123 is disposed adjacent to the fourth LED chip 124, so that blue light and yellow light can be quickly mixed to improve light emitting efficiency. In this case, the third LED chip 123 and the fourth LED chip 124 are placed close to each other, so that the blue light and the yellow light are sufficiently mixed to form a purer white color, thus improving the color saturation of the display device.

In the embodiment of the backlight module 1000, the light emitting area of the first LED chip 121 is less than the light emitting area of the fourth LED chip 124. The light emitting area of the fourth LED chip 124 is less than the light emitting area of the second LED chip 122. The light emitting area of the second LED chip 122 is less than the light emitting area of the third LED chip 123.

Under the condition of the same area, the luminance of the first LED chip 121 is greater than the luminance of the fourth LED chip 124, the luminance of the fourth LED chip 124 is greater than the luminance of the second LED chip 122, and the luminance of the second LED chip 122 is greater than the luminance of the third LED chip 123. Accordingly, in order to improve uniformity of the luminance of the light in the first embodiment of the backlight module 100, the light emitting area of the first LED chip 121 is set to be less than the light emitting area of the fourth LED chip 124, the light emitting area of the fourth LED chip 124 is set to be less than the light emitting area of the second LED chip 122, and the light emitting area of the second LED chip 122 is set to be less than the light emitting area of the third LED chip 123.

In the embodiment of the backlight module 1000, the optical film structure 14 includes a first optical film layer 141, a second optical film layer 142, and a third optical film layer 143 disposed sequentially. The first optical film layer 141 is disposed on a sealant 13.

The first optical film layer 141 is a light-diffusing layer. The second optical film layer 142 is a light-enhancing layer. The third optical film layer 143 is a light-diffusing layer or a composite layer of a light-diffusing layer and a light-enhancing layer.

The first optical film layer 141 is configured to diffuse the light emitted by the mini-LED chip 12, thereby expanding the light-emitting angle, and therefore when the light is mixed, the light-mixing is more sufficient, thus improving the light-mixing effect.

The second optical film layer 142 is configured to brighten the diffused light to improve the brightness of the backlight module 100.

The third optical film layer 143 is configured to diffuse and/or brighten the brightened light again to further enlarge the light-emitting angle of the light and improve the light-mixing effect, and further improve the brightness of the overall light source.

In some embodiments, the light emitting surfaces of the fourth LED chip and the third LED chip are concave. Such a setting expands the light-emitting angle of the third and fourth LED chips and improves the light-mixing effect. The light exiting surfaces of the first and second LED chips may also be concave surfaces.

Optionally, the concave surface of the mini-LED chip is a concave spherical surface, so that the light-diffusing angle is more balanced.

Optionally, the concave surface of the mini-LED chip is a concave curved surface, so that most of the light emitted by the mini-LED chip is diffused toward the adjacent different LED chips to achieve the purpose of improving the light-mixing effect.

Compared with the backlight module and the display device of the prior art, the backlight module and the display device of the present invention save the step of doping yellow phosphor into the sealant by disposing the first, second, third, and fourth LED chips. The transparent sealant of the present invention reduces the generation of stray light generation, improves the saturation of color, and has the function of switching color saturation. The present invention solves the technical problem that the existing mini-LED surface light source easily forms stray light when emitting a single color light, thereby reducing the color saturation.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A backlight module, comprising:
   a substrate;
   a plurality of mini light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light;
   a sealant, being transparent, disposed on the substrate and covering the mini-LED chips for packaging; and
   an optical film structure, disposed on the sealant to diffuse, and brightens light emitted by the mini-LED chips; wherein
   the first LED chip, the second LED chip, the third LED chip, and the fourth LED chip are arranged side-by-side in a horizontal or vertical direction to form a repeating unit; and
   the optical film structure comprises a first optical film layer, a second optical film layer and a third optical film layer disposed sequentially on the sealant; and wherein the first optical film layer is a light diffusing layer, the second optical film layer is a light brightening layer, and the third optical film layer is a light diffusing layer or a composite layer of a light diffusing layer and a light brightening layer.

2. The backlight module according to claim 1, wherein a plurality of the repeating units are arranged in an array, and the third LED chip is adjacent to a side of the fourth LED chip.

3. The backlight module according to claim 2, wherein a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

4. A backlight module comprising:
a substrate
a plurality of mini light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light, and a sealant, being transparent, disposed on the substrate and covering the mini-LED chips for package; and
an optical film structure disposed on the sealant to diffuse and brighten light emitted by the mini-LED chips,
wherein the optical film structure comprises a first optical film layer, a second optical film layer, and a third optical film layer, disposed sequentially on the sealant; and
wherein the first optical film layer is a light diffusing layer, the second optical film layer is a light brightening layer, and the third optical film layer is a light diffusing layer or a composite layer of a light diffusing layer and a light brightening layer.

5. The backlight module according to claim 4, wherein the first LED chip, the second LED chip, the third LED chip, and the fourth LED chip are arranged side by side in a horizontal or vertical direction to form a repeating unit.

6. The backlight module according to claim 4, wherein the first LED chip, the second LED chip, the third LED chip, and the fourth LED chip are arranged two-by-two and side-by-side to form a repeating unit.

7. The backlight module according to claim 5, wherein the plurality of repeating units are arranged in an array, and the third LED chip is adjacent to a side of the fourth LED chip.

8. The backlight module according to claim 6, wherein the plurality of repeating units are arranged in an array, and the third LED chip is adjacent to a side of the fourth LED chip.

9. The backlight module according to claim 7, wherein a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

10. The backlight module according to claim 6, wherein the repeating unit has a square shape.

11. A display device comprising a backlight module and a display panel disposed on the backlight module, the backlight module comprising:
a substrate
a plurality of mini light-emitting diode (mini-LED) chips disposed on the substrate for light emission, wherein the mini-LED chips are spaced apart from each other and comprise a first LED chip for emitting red light, a second LED chip for emitting green light, a third LED chip for emitting blue light, and a fourth LED chip for emitting yellow light;
a sealant, being transparent, disposed on the substrate and covering the mini-LED chips for package; and
the optical film structure disposed on the sealant to diffuse and brighten light emitted by the mini-LED chips,
wherein the optical film structure comprises a first optical film layer, a second optical film layer and a third optical film layer disposed sequentially on the sealant; and
wherein the first optical film layer is a light diffusing layer, the second optical film layer is a light brightening layer, and the third optical film layer is a light diffusing layer or a composite layer of a light diffusing layer and a light brightening layer.

12. The display device according to claim 11, wherein the first LED chip, the second LED chip, the third LED chip, and the fourth LED chip are arranged two-by-two and side-by-side to form a repeating unit, a plurality of repeating units are arranged in an array, and the third LED chip is adjacent to a side of the fourth LED chip.

13. The display device according to claim 12, wherein a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

14. The display device according to claim 12, wherein the repeating unit has a square shape.

15. The display device according to claim 11, wherein the first LED chip, the second LED chip, the third LED chip, and the fourth LED chip are arranged side by side in a horizontal or vertical direction to form a repeating unit, the plurality of repeating units are arranged in an array, and the third LED chip is adjacent to a side of the fourth LED chip.

16. The display device according to claim 15, wherein a light emitting area of the first LED chip is less than a light emitting area of the fourth LED chip, a light emitting area of the fourth LED chip is less than a light emitting area of the second LED chip, and the light emitting area of the second LED chip is less than a light emitting area of the third LED chip.

* * * * *